(12) United States Patent
Hong et al.

(10) Patent No.: US 8,349,219 B2
(45) Date of Patent: Jan. 8, 2013

(54) CARBON NANOTUBE BULK MATERIAL AND METHOD OF FABRICATING THE SAME

(75) Inventors: Soonhyung Hong, Yuseong-gu (KR);
Seongwoo Ryu, Yuseong-gu (KR);
Jaewon Hwang, Yuseong-gu (KR);
Taegwan Park, Yuseong-gu (KR);
Haeshin Lee, Yuseong-gu (KR); Yuhan Lee, Yuseong-gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 332 days.

(21) Appl. No.: 12/702,479

(22) Filed: Feb. 9, 2010

(65) Prior Publication Data

US 2010/0314586 A1    Dec. 16, 2010

(30) Foreign Application Priority Data

May 29, 2009  (KR) .................. 10-2009-0047619

(51) Int. Cl.
*H01B 1/18*      (2006.01)
*H01B 1/24*      (2006.01)

(52) U.S. Cl. ........................ 252/511; 252/510
(58) Field of Classification Search .................. 252/511, 252/510
See application file for complete search history.

(56) References Cited

U.S. PATENT DOCUMENTS

| | | | |
|---|---|---|---|
| 7,968,013 B2* | 6/2011 | Choi et al. ................... 252/511 |
| 2003/0068535 A1* | 4/2003 | Takiguchi et al. ............ 428/704 |
| 2003/0072964 A1* | 4/2003 | Kwong et al. ................ 428/690 |
| 2005/0186378 A1* | 8/2005 | Bhatt ............................. 428/36.9 |
| 2006/0263688 A1* | 11/2006 | Guyomard et al. ........... 429/217 |
| 2006/0270790 A1* | 11/2006 | Comeau ........................ 524/847 |
| 2007/0128466 A1* | 6/2007 | Nomura et al. ............... 428/690 |
| 2007/0166472 A1* | 7/2007 | Jin et al. ...................... 427/407.1 |
| 2007/0243410 A1* | 10/2007 | Kathirgamanathan et al. ............................. 428/690 |
| 2007/0272920 A1* | 11/2007 | Kathirgamanathan et al. .. 257/40 |
| 2008/0293321 A1* | 11/2008 | Kang et al. ....................... 445/50 |
| 2009/0226684 A1* | 9/2009 | Bahnmuller et al. ......... 428/206 |
| 2010/0041292 A1* | 2/2010 | Kim et al. ..................... 442/181 |
| 2010/0117522 A1* | 5/2010 | Park et al. ..................... 313/504 |
| 2010/0136224 A1* | 6/2010 | Britz et al. .................... 427/122 |

FOREIGN PATENT DOCUMENTS

| | | |
|---|---|---|
| WO | WO 2005/081781 | 9/2005 |
| WO | WO 2005/100466 | 10/2005 |

OTHER PUBLICATIONS

CAS reg. No. 28210-41-5, Nov. 16, 1984.*
Xiaobo Zhang et al., "Spinning and Processing Continuous Yarns from 4-Inch Wafer Scale Super-Aligned Carbon Nanotube Arrays", Advanced Materials 18, 2006, pp. 1505-1510.
Mei Zhang et al., "Multifunctional Carbon Nanotube Yarns by Downsizing an Ancient Technology", Science vol. 306, Nov. 19, 2004, pp. 1358-1361.

* cited by examiner

*Primary Examiner* — Douglas McGinty
(74) *Attorney, Agent, or Firm* — Sherr & Jiang, PLLC (57) ABSTRACT

A carbon nanotube bulk material is provided. The carbon nanotube bulk material includes carbon nanotubes constituting a matrix and a polymer binder interposed between the carbon nanotubes. The polymer binder includes a polymer backbone and at least one organic moiety grafted to a terminal or a side of the polymer backbone. The organic moiety has a $C_3$-$C_{24}$ aromatic functional group having at least one hydroxy group.

14 Claims, 6 Drawing Sheets

CARBON NANOTUBE BULK MATERIAL AND METHOD OF FABRICATING THE SAME

CROSS REFERENCE TO PRIOR APPLICATIONS

This application claims priority to Korean Patent Application No. 10-2009-0047619 (filed on May 29, 2009), which is hereby incorporated by reference in its entirety.

TECHNICAL FIELD

The described technology relates generally to a carbon nanotube bulk material and a method of fabricating the same and, more particularly, to a carbon nanotube bulk material having improved mechanical strength, and a method of fabricating the same.

BACKGROUND

A carbon nanotube has a strength of several tens of GPa, an elastic modulus of several hundreds of TPa, and excellent electrical and thermal conductivities, which surpass those of a-conventional carbon fiber. Various researches on processes for fabrication of carbon nanotube bulk material have been performed over many years. Particularly, research on carbon nanotube fibers among carbon nanotube bulk materials has been performed by the R. H. Baughman group in U.S. (M. Zhang et al, *Science* 306, 1358 (2004)) and the S. Fan research group in China (X. Zhang et al, *Adv. Mater.* 18, 1505 (2006)), but they were not able to obtain any results showing own characteristic properties of the carbon nanotubes due to weak binding strength between the carbon nanotubes. Thus, to harness the excellent own characteristic properties of the carbon nanotubes, improvement in performance of the carbon nanotube bulk material is required.

SUMMARY

In one embodiment, a carbon nanotube bulk material is provided. The carbon nanotube bulk material includes carbon nanotubes constituting a matrix; and a polymer binder interposed between the carbon nanotubes. The polymer binder includes a polymer backbone and at least one organic moiety grafted to a terminal or a side of the polymer backbone. The organic moiety has a $C_3$-$C_{24}$ aromatic functional group having at least one hydroxy group.

In another embodiment, a method of fabricating a carbon nanotube bulk material is provided. The method includes the steps of: providing a carbon nanotube aerogel as a matrix; providing a polymer binder solution by dissolving a polymer binder in a volatile solvent, wherein the polymer binder includes a polymer backbone and at least one organic moiety grafted at a terminal or a side of the polymer backbone, wherein the organic moiety has a $C_3$-$C_{24}$ aromatic functional group having at least one hydroxy group; infiltrating the polymer binder solution into the carbon nanotube aerogel; and removing the volatile solvent to densify the carbon nanotube aerogel.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The above and other features and advantages of the present disclosure will become more apparent to those ordinarily skilled in the art by describing in detail example embodiments thereof with reference to the attached drawings in which.

DETAILED DESCRIPTION

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

It will also be understood that when an element or layer is referred to as being "on," another element or layer, the element or layer may be directly on the other element or layer or intervening elements or layers may be present. As used herein, the term "and/or" may include any and all combinations of one or more of the associated listed items.

Hereinafter, a technological description disclosed in the specification will be explained in further detail with reference to the accompanying drawings.

Figure 1:
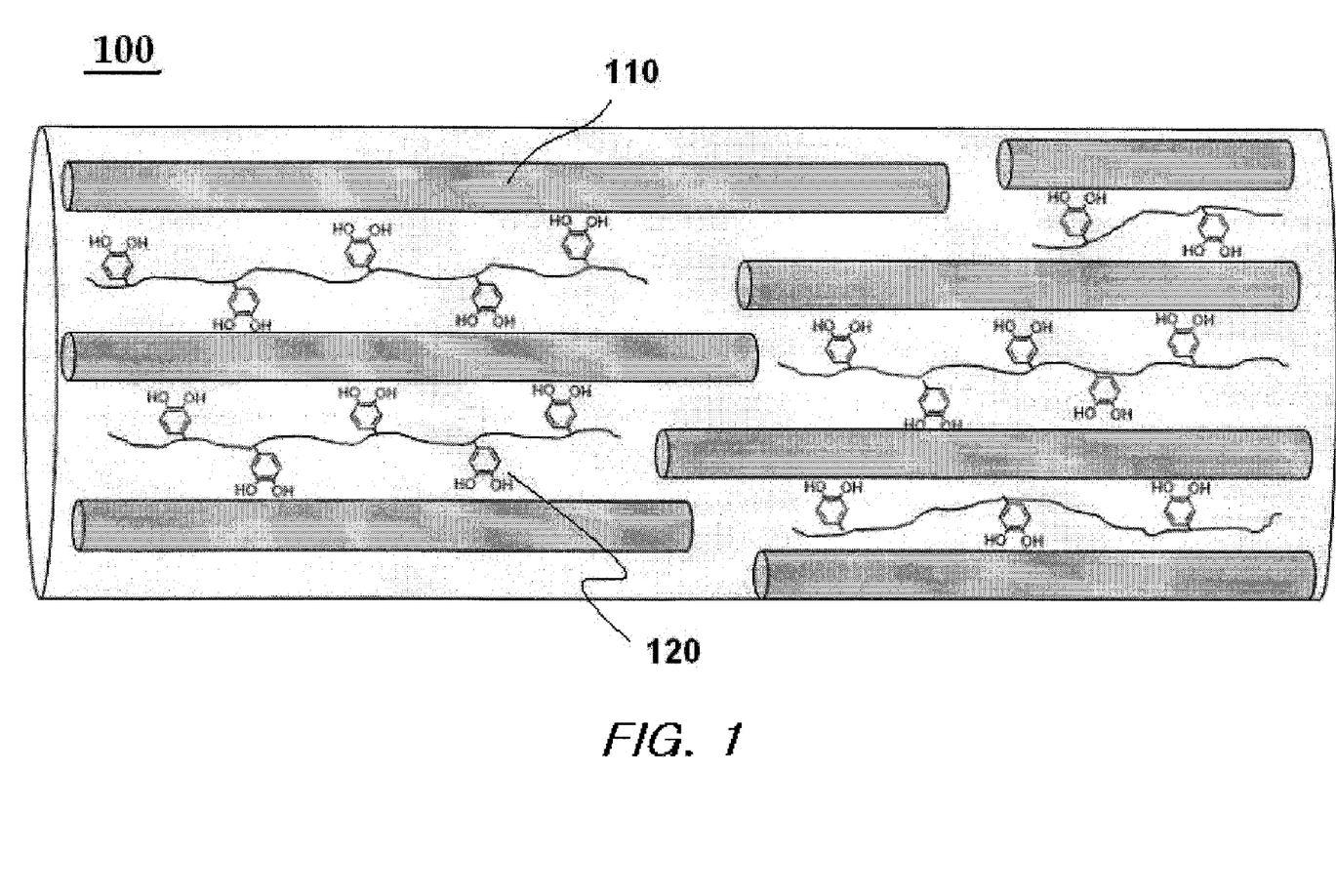
FIG. 1 schematically illustrates a carbon nanotube bulk material according to one embodiment.

FIG. 1 schematically illustrates a carbon nanotube bulk material according to one embodiment. Referring to FIG. 1, a carbon nanotube bulk material 100 may include a matrix, which is composed of carbon nanotubes 110, and a polymer binder 120 interposed between the carbon nanotubes 110.

The carbon nanotubes 110 may be single-walled carbon nanotubes or multi-walled carbon nanotubes. The carbon nanotubes 110 may be formed by arc-discharge, laser evaporation, plasma enhanced chemical vapor deposition, thermal chemical vapor deposition, vapor phase growth, or electrolysis and may have a diameter of about 3 to 40 nm and a length of several nanometers to millimeters.

The polymer binder 120 may include a polymer backbone and at least one organic moiety, which is grafted to a terminal or a side of the polymer backbone. The organic moiety may include a $C_3$-$C_{24}$ aromatic functional group having at least one hydroxy group. The organic moiety may be grafted onto the polymer backbone using a specific site (e.g., N or O) in the polymer. A weight average molecular weight of the polymer is not substantially limited if the polymer has viscosity and workability suitable to fabricate a bulk material. The weight average molecular weight of the polymer may be generally in a range of 500 to 1,000,000, and preferably in a range of 1,000 to 100,000. The polymer may be a hydrophilic polymer. The hydrophilic polymer may include any hydrophilic polymer, which is known to those skilled in the art. The hydrophilic polymer may be, but is not limited to, polyvinyl alcohol, polyethyleneimine, polyvinyl pyrrole, polyvinyl pyrrolidone, hydroxypropyl cellulose, polyacrylic acid, polyethylene glycol, a saponified polyethylene-vinyl acetate copolymer, or any combination thereof. Since the polymer binder 120 may have an organic moiety including a $C_3$-$C_{24}$ aromatic functional group having at least one hydroxy group, when it is interposed between the carbon nanotubes 110, a stronger attractive force than the van der Waals force may be generated between the carbon nanotubes 110 and the polymer binder 120. More specifically, the attractive force may include an π-π interaction with a carbon nanotube by the aromatic group of the organic moiety and include a hydrogen bond and a covalent bond by the hydroxy group of the functionalized carbon nanotube. Furthermore, the attractive force may include a metallic bond due to a catalyst presented in a synthesized carbon nanotube. The above-mentioned attractive force may make a strong binding between the carbon nanotubes 110 and the polymer binder 120, and the carbon nanotubes 110 may strongly bind with each other by way of the polymer binder 120. As a result, the mechanical strength of the carbon nanotube bulk material 100 may increase.

The organic moiety may be grafted onto the polymer backbone at a specific binding site in the hydrophilic polymer. The specific binding site may be a functional group such as an —OH, —NH$_2$, or —CO$_2$H group in the polymer. The mechanical strength of the carbon nanotube bulk material 100 may be varied with the grafting ratio (%) of the organic moiety. The grafting ratio (%) is a ratio of the number of the grafted organic moieties to the total number of functional groups of the polymer, and may be measured by using an UV spectrophotometer or $^1$H-NMR. The grafting ratio may be 1 to 90%, preferably 1 to 50%, and more preferably 25%. When the grafting ratio is less than 1%, the adhesive strength may be weak, and when the grafting ratio is more than 90%, the organic moiety exists in the form of a domain and the adhesive strength may be weak thereby. The weight average molecular weight of the polymer binder 120 may be determined by a weight average molecular weight of the hydrophilic polymer and the grafting ratio (%).

The $C_3$-$C_{24}$ aromatic functional group included in the organic moiety may be a $C_6$-$C_{24}$ aryl group or a $C_3$-$C_{24}$ heteroaryl group. The $C_6$-$C_{24}$ aryl group refers to an aromatic carbocyclic system including at least one aromatic ring containing 6 to 24 carbon atoms. The $C_3$-$C_{24}$ heteroaryl group refers to a heteroaromatic system including at least one hetero aromatic ring having one or more heteroatoms selected from N, O, P or S, and containing 3 to 24 carbon atoms. The aromatic rings and the heteroaromatic rings may be combined together by one sigma bond (pendant) or two sigma bonds (fused).

At least one hydrogen atom in the aromatic functional group may be substituted with a hydroxy group. The $C_3$-$C_{24}$ aromatic functional group may have at least one hydroxy group by the substitution with the hydroxy group, thereby resulting in a further increase in adhesive strength between the carbon nanotubes 110 and the polymer binder 120. Examples of the $C_3$-$C_{24}$ aromatic functional group having at least one hydroxy group may include a phenol group, a catechol group, a gallol group, or any combination thereof.

The organic moiety may be represented by Formula 1.

[Formula 1]

In Formula 1, "*" is a site for binding with the polymer backbone.

"L" is a linking group selected from the group consisting of —C(=O)—(CH$_2$CH$_2$O)$_a$—(C(=O)NH)$_b$—(CH$_2$)$_c$— and —NH—(CH$_2$CH$_2$O)$_d$—(C(=O)NH)$_e$—(CH$_2$)$_f$—.

"a", "c", "d", and "f" may independently be integers ranging from 0 to 20, and "b" and "e" may independently be 0 or 1.

"Ar" may be a $C_6$-$C_{24}$ aryl group or a $C_3$-$C_{24}$ heteroaryl group. Examples of the aryl group may include phenyl, naphthyl, anthracene, fluorenyl, and tetrahydronaphthyl. Examples of the heteroaryl group may include pyridine, pyrrole, pyrimidine, quinoline, isoquinoline, imidazole, thiazole, piperazine, pyrazole, indole, purine, furan, and thiophene.

"n" denotes the number of hydroxy groups linked with "Ar" and is an integer ranging from 1 to 17.

For example, the organic moiety may be represented by, but is not limited to, one of Formulae 1A, 1B and 1C.

[Formula 1A]

[Formula 1B]

[Formula 1C]

The polymer binder 120 may be a polymer onto which the above-mentioned organic moiety, which is represented by one of Formulae 1A through 1C, is grafted. For example, the polymer binder 120 may include a repeating unit represented by Formula 2A or 2B.

[Formula 2A]

[Formula 2B]

A content of the polymer binder 120 may be 1 to 100 parts by weight, preferably 5 to 50 parts by weight, and more preferably 10 to 25 parts by weight with respect to 100 parts by weight of the carbon nanotube 110. In the above ranges, the polymer binder 120 may provide excellent adhesive strength.

The carbon nanotube bulk material may have a tensile strength of 800 to 1,400 MPa and a modulus of 80 to 140 GPa in the tensile test performed at a speed of 0.1 mm/minute by using a strain gauge (gauge length=1 cm).

Now, a method of fabricating a carbon nanotube bulk material according to one embodiment will be described.

Figure 2:
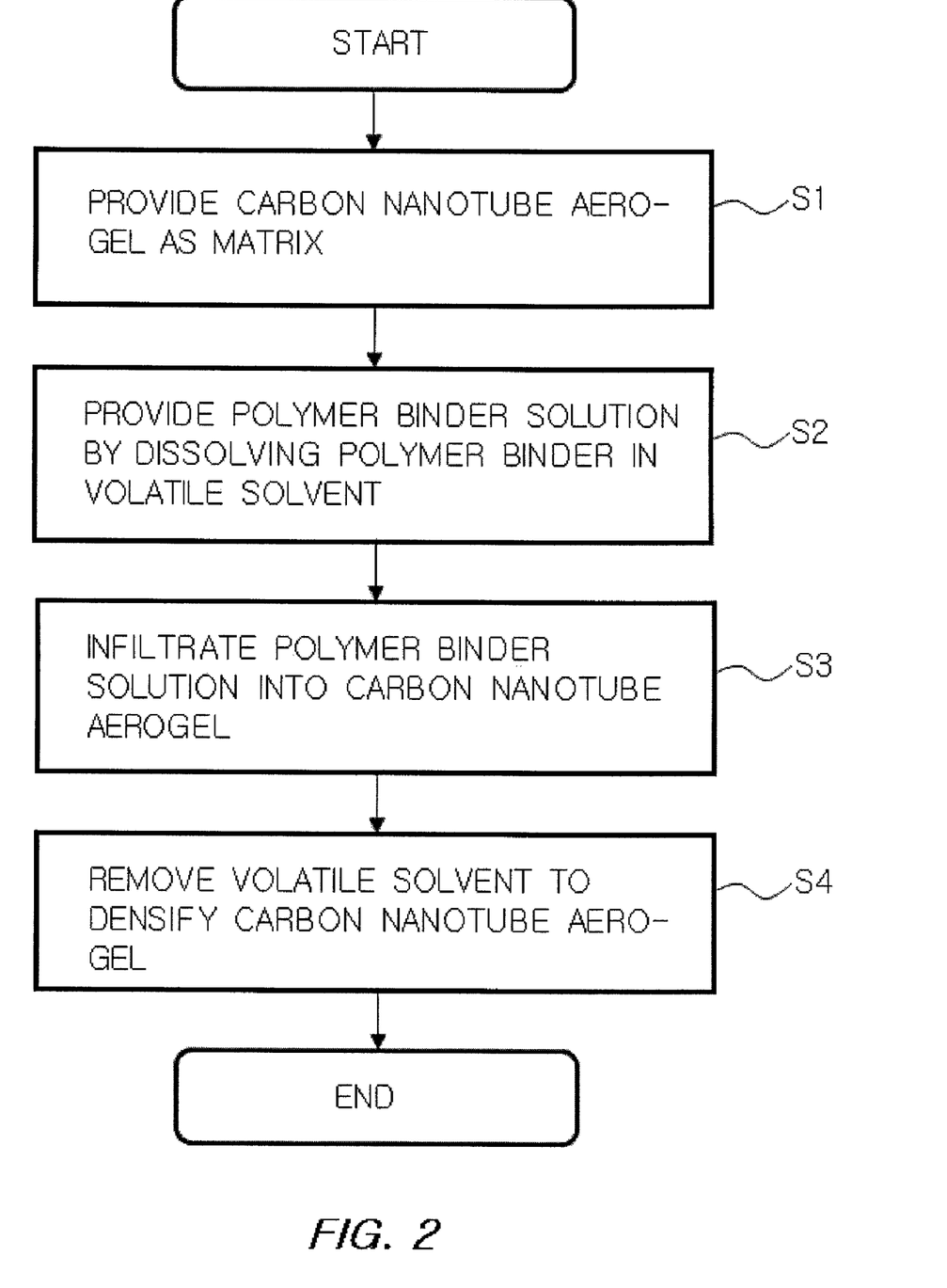
FIG. 2 is a flowchart illustrating a method of fabricating a carbon nanotube bulk material according to one embodiment.

FIG. 2 is a flowchart illustrating a method of fabricating a carbon nanotube bulk material according to one embodiment. Referring to FIG. 2, in step S1, a carbon nanotube aerogel is provided as a matrix. The carbon nanotube aerogel may be fabricated in the form of a yarn or a sheet. The carbon nanotube aerogel may be fabricated by various known methods. For example, a carbon nanotube forest, which is a kind of carbon nanotube aerogel, may be fabricated by depositing a catalyst on a silicon wafer substrate and then providing carbon source gas for chemical vapor deposition. The carbon nanotube forest fabricated as such may be used as a matrix to synthesize a carbon nanotube bulk material. As another example, a carbon nanotube forest may be fabricated in the form of a carbon nanotube fiber by a dry or a wet process to be used for the synthesis of the carbon nanotube bulk material. As still another example, the carbon nanotube aerogel may be a carbon nanotube thin film or a carbon nanotube bucky paper. For example, the carbon nanotube bucky paper to be used herein may be obtained by dispersing carbon nanotubes in an aqueous solution containing a surfactant, removing the aqueous solvent by using vacuum filtration, and then separating the obtained film from a filter paper.

In step S2, a polymer binder solution prepared by dissolving a polymer binder in a volatile solvent is provided. The polymer binder includes a polymer backbone and at least one organic moiety that is grafted to a terminal or a side of the polymer backbone and has a $C_3$-$C_{24}$ aromatic functional group having at least one hydroxy group. The volatile solvent is not substantially limited as long as it can dissolve the polymer binder and be easily removed thereafter. For example, the volatile solvent may include methanol, ethanol, or isopropyl alcohol. The polymer binder may be dissolved in the volatile solvent in a proper concentration of, for example, 0.01 to 50 wt %, thereby preparing the solution.

In step S3, the polymer binder solution is infiltrated into the carbon nanotube aerogel. When the polymer binder solution is in contact with the carbon nanotube aerogel and infiltrated between the carbon nanotubes because of capillary action, the adhesive strength between the carbon nanotubes may increase, as described above.

In step S4, the volatile solvent is removed to densify the carbon nanotube aerogel, thereby obtaining a carbon nanotube bulk material. For example, the volatile solvent may be removed by being dried out in a vacuum oven at 50 to 90° C. for 1 to 3 hours. As the volatile solvent is removed, the carbon nanotube bulk material is capable of being densified because of surface energy.

The carbon nanotube bulk material completed through the densification may be fabricated from various aerogels as described above. As an example, a sheet-type super-aligned carbon nanotube bulk material may be fabricated by infiltrating the polymer binder solution using the carbon nanotube forest formed on the substrate as a matrix. As another example, a yarn-type carbon nanotube bulk material may be fabricated by drawing out a carbon nanotube fiber from the carbon nanotube forest and infiltrating the polymer binder solution into the carbon nanotube fiber. As still another example, a sheet-type carbon nanotube bulk material may be fabricated in the form of a carbon nanotube bucky paper by infiltrating the polymer binder solution into a carbon nanotube film formed of a carbon nanotube by spin coating, spray coating, Langmuir-Blodgett deposition, or vacuum filtration.

A strength of the carbon nanotube bulk material may be changed according to the kind of the hydrophilic polymer, the kind and the grafting ratio of the organic moiety grafted onto the hydrophilic polymer, and the part by weight of the polymer binder included in the total carbon nanotube bulk material.

Since the carbon nanotube bulk material has a very high strength, compared to the conventional carbon nanotube bulk material having a poor adhesive strength, it can be used as an ultra-light and high-strength material for a space elevator or an artificial muscle, or as a high-strength functional material for an electron-textile, a biosensor, a supercapacitor, or a field emitting display (FED).

Now, the technology disclosed herein will be described in further detail with reference to specific examples and comparative examples. However, the examples are merely illustrative to facilitate a ready understanding of the present disclosure and do not limit the scope of the technology disclosed herein.

Preparation Example 1

Mixtures 1, 2 and 3 were prepared as follows:
Mixture 1: 41.2 mg of dihydrocaffeic acid (3,4-dihydroxybenzenepropanoic acid) was dissolved in 10 ml of dimethylformamide (DMF).
Mixture 2: 42.5 mg of 1-ethyl-3-(3-dimethylaminopropyl) carbodiimide hydrochloride (EDC) was dissolved in 30 ml of methanol.
Mixture 3: 1 g of polyethyleneimine (PEI, Mw=about 25,000) was dissolved in 30 ml of methanol.

Mixtures 1 and 2 were mixed with each other to activate dihydrocaffeic acid (DHCA) with EDC for 30 minutes. Afterwards, Mixture 3 was added to the resulting product and allowed to react for 12 hours. After the resulting product was precipitated twice using 300 ml of diethyl ether, the resulting precipitate was dissolved in deionized water (to adjust a pH to 5 or less) and dialyzed against the deionized water for 24 hours. The dialyzed product was freeze-dried to yield 8.7 g of Sample 1 (DHCA-grafted PEI, grafting ratio=28%).

Preparation Example 2

The same method as described in Preparation Example 1 was used, except that the content of DHCA in Mixture 1 was changed to 15 mg. Thus, 8.3 g of Sample 2 (DHCA-grafted PEI, grafting ratio=7.47%).

Example 1

An aluminum (Al) buffer layer and an iron (Fe) catalyst were deposited to a thickness of 3 to 10 nm on a silicon wafer using sputtering equipment and allowed to react at a reaction temperature of 650 to 800° C. for 15 to 60 minutes by using chemical vapor deposition, thereby fabricating a carbon nanotube forest. A nanofiber yarn was obtained from the carbon nanotube forest by a spinning process. A solution prepared by dissolving Sample 1 at 10 wt % in methanol was infiltrated into the nanofiber yarn, thereby fabricating a yarn-type carbon nanotube bulk material.

Comparative Example 1

A yarn-type carbon nanotube bulk material was fabricated by the same method as described in Example 1, except that only a methanol solvent was infiltrated into the nanofiber yarn to densify after the spinning process.

Example 2

A carbon nanotube forest was fabricated on a silicon wafer by the same fabrication process as described in Example 1. A solution prepared by dissolving Sample 2 at 20 wt % in methanol is infiltrated into the carbon nanotube forest, thereby fabricating a sheet-type super-aligned carbon nanotube bulk material.

Comparative Example 2

A sheet-type super-aligned carbon nanotube bulk material was fabricated by the same method as described in Example 2, except that only a methanol solvent was infiltrated into the carbon nanotube forest to densify.

Example 3

Carbon nanotubes (HiPC®, Carbon Nanotechnologies Incorporated) were put into water in which sodium dodecyl sulfate (SDS), a surfactant, was dissolved at 1 wt %, to make a concentration of 5 mg/ml and dispersed in the water by 4-hour sonication, thereby preparing a carbon nanotube aqueous dispersion. The aqueous dispersion was filtered in a vacuum and dried at 80 t for 2 hours, thereby fabricating a carbon nanotube bucky paper on a filter paper. A solution prepared by dissolving Sample 2 at 20 wt % in ethanol was infiltrated into the carbon nanotube bucky paper, thereby fabricating a sheet-type carbon nanotube bulk material.

Figure 3:
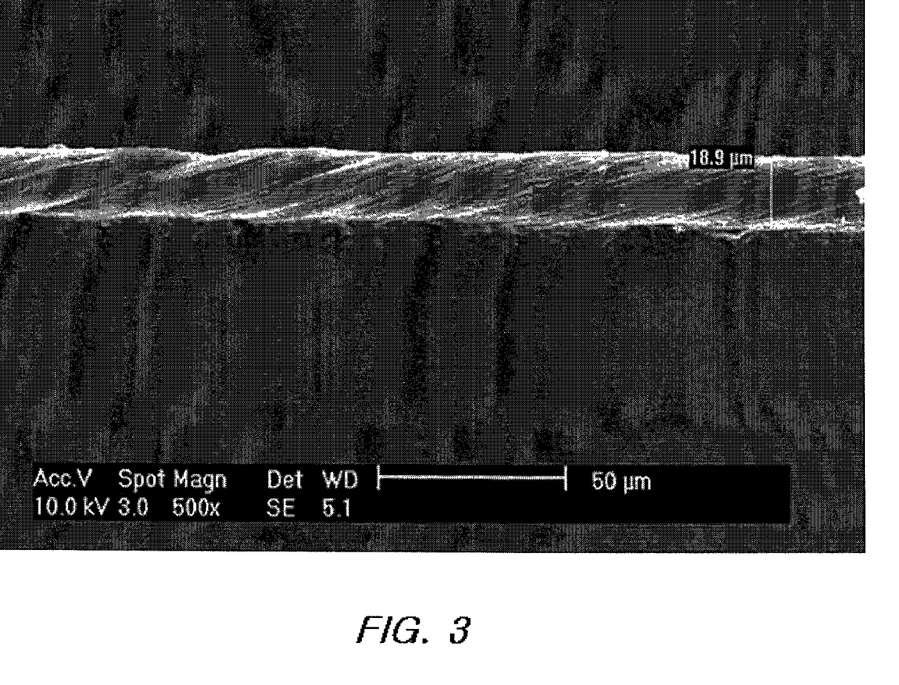
FIG. 3 shows a scanning electron microscopic (SEM) photograph of the carbon nanotube bulk material fabricated according to Example 1.
Figure 4:
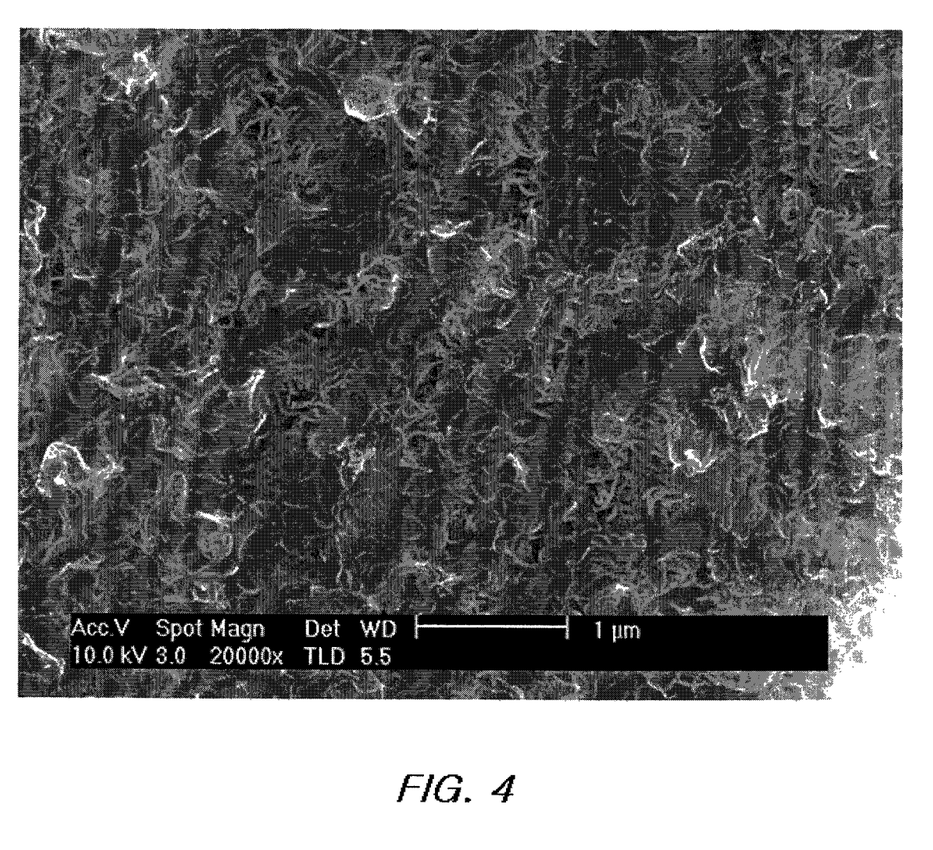
FIG. 4 shows a SEM photograph of the carbon nanotube bulk material fabricated according to Example 2.

SEM photographs of the carbon nanotube bulk materials fabricated according to Examples 1 and 2 are shown in FIGS. 3 and 4, respectively.

Experimental Example 1

Figure 5:
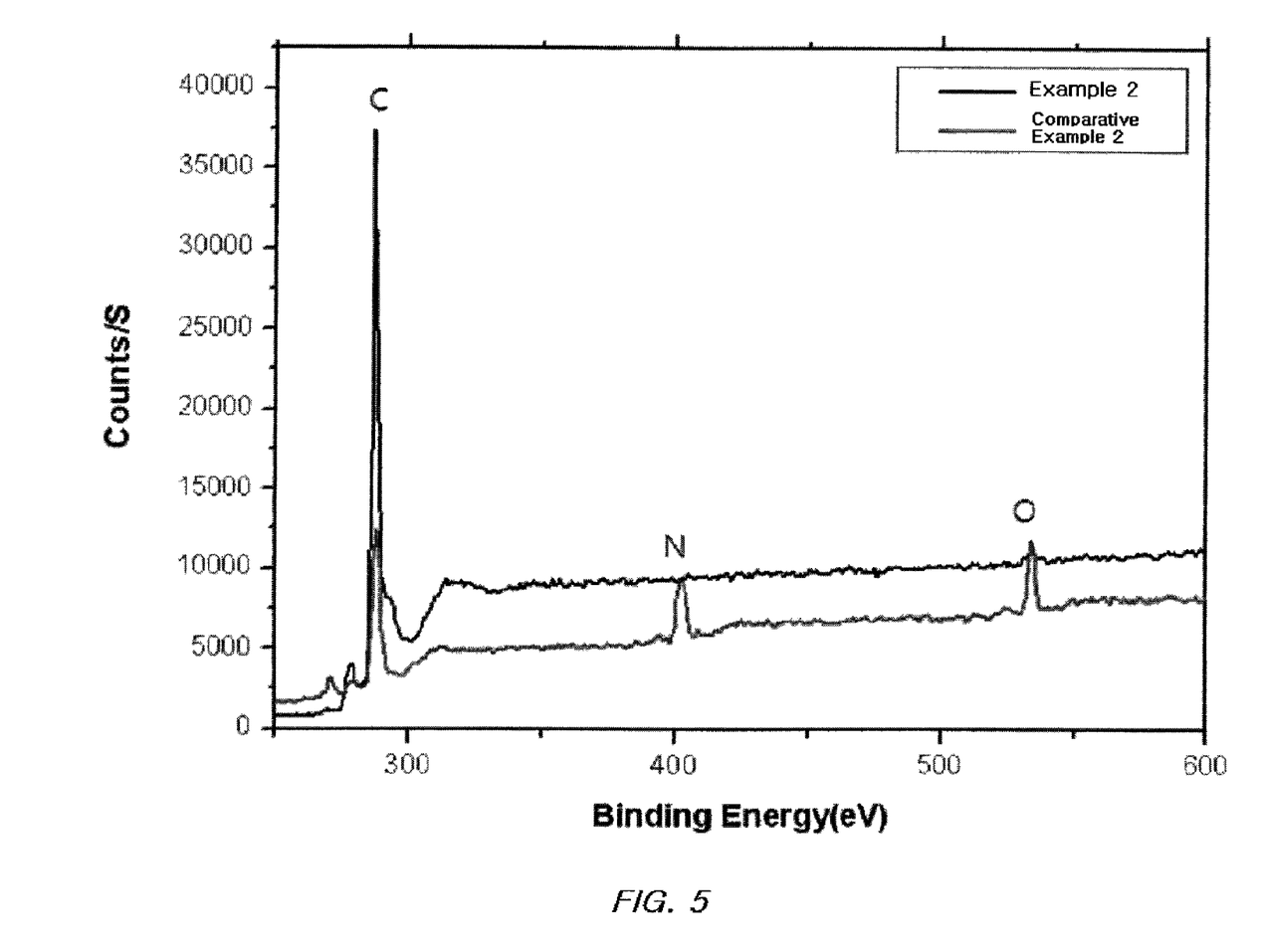
FIG. 5 is a graph showing results of X-ray photoelectron spectroscopy (XPS) for the sheet-type super-aligned carbon nanotube bulk materials fabricated according to Example 2 and Comparative Example 2.

Compositions of the sheet-type super-aligned carbon nanotube bulk materials fabricated according to Example 2 and Comparative Example 2 were analyzed by XPS, and thus the results are shown in FIG. 5. Referring to FIG. 5, it can be confirmed that the carbon nanotube bulk material of Example 2, which was treated with a polymer binder, contains a higher content of carbon compared to the carbon nanotube bulk material of Comparative Example 1. This indicates that the polymer binder is uniformly infiltrated into the carbon nanotube bulk material.

Experimental Example 2

A tensile test was conducted for the yarn-type carbon nanotube bulk materials fabricated in the form of aerogel according to Example 1 and Comparative Example 1.

Figure 6:
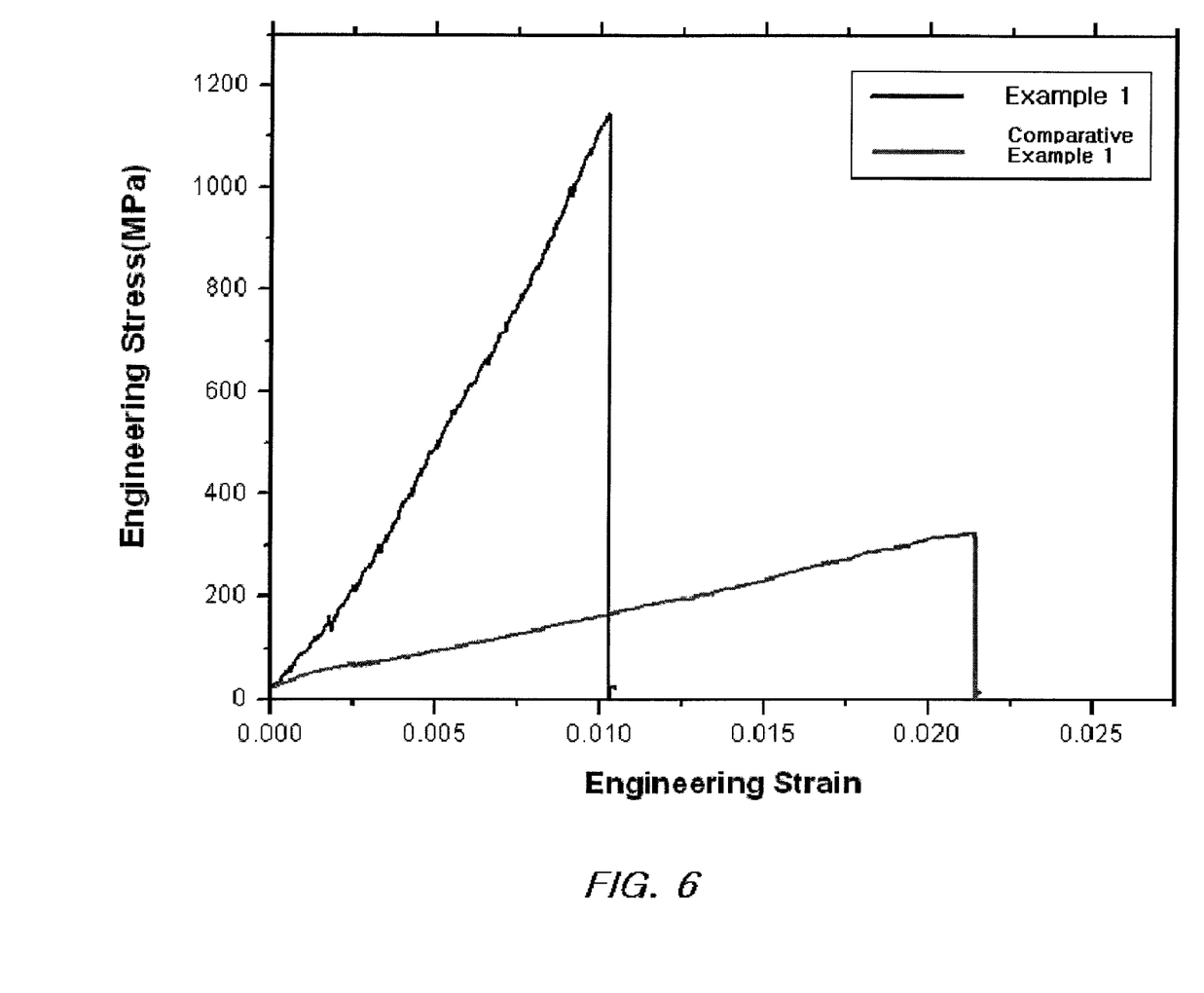
FIG. 6 is a graph showing results of a tensile test for the yarn-type carbon nanotube bulk materials fabricated according to Example 1 and Comparative Example 1.

The tensile strength was measured by pulling the carbon nanotube bulk material at a speed of 0.1 mm/minute by using a strain gauge (gauge length=1 cm). FIG. 6 is a graph showing the results of the tensile test for the yarn-type carbon nanotube bulk materials fabricated according to Example 1 and Comparative Example 1. Referring to FIG. 6, compared to the yarn-type carbon nanotube bulk material of Comparative Example 1 having a tensile strength of 320 MPa and a modulus of 28 GPa, it can be confirmed that the yarn-type carbon nanotube bulk material of Example 1 is greatly increased in tensile strength (i.e., 1180 MPa) and modulus (i.e., 120 GPa).

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A carbon nanotube bulk material, comprising:
   carbon nanotubes constituting a matrix; and
   a polymer binder interposed between the carbon nanotubes,
   wherein the polymer binder includes a polymer backbone, and at least one organic moiety grafted to one of a terminal and a side of the polymer backbone; and
   wherein the organic moiety has a $C_3$-$C_{24}$ aromatic functional group having at least one hydroxy group,
   wherein the matrix is formed of one of a yarn-type carbon nanotube aerogel and a sheet-type carbon nanotube aerogel.

2. A carbon nanotube bulk material, comprising:
   carbon nanotubes constituting a matrix; and
   a polymer binder interposed between the carbon nanotubes,
   wherein the polymer binder includes a polymer backbone, and at least one organic moiety grafted to one of a terminal and a side of the polymer backbone; and
   wherein the organic moiety has a $C_3$-$C_{24}$ aromatic functional group having at least one hydroxy group,
   wherein the $C_3$-$C_{24}$ aromatic functional group having at least one hydroxy group includes at least one selected from the group consisting of phenol, catechol, and gallol groups.

3. The material according to claim 2, wherein the polymer binder is included in an amount between 1 to 100 parts by weight for every 100 parts by weight of the carbon nanotubes.

4. The material according to claim 2, wherein the polymer has a weight average molecular weight between 500 to 1,000,000.

5. The material according to claim 2, wherein the polymer is a hydrophilic polymer.

6. A carbon nanotube bulk material, comprising:
carbon nanotubes constituting a matrix; and
a polymer binder interposed between the carbon nanotubes,
wherein the polymer binder includes a polymer backbone, and at least one organic moiety grafted to one of a terminal and a side of the polymer backbone; and
wherein the organic moiety has a $C_3$-$C_{24}$ aromatic functional group having at least one hydroxy group,
wherein the polymer is a hydrophilic polymer,
wherein the hydrophilic polymer includes at least one selected from the group consisting of polyvinyl alcohol, polyethyleneimine, polyvinyl pyrrole, polyvinyl pyrrolidone, hydroxypropyl cellulose, polyacrylic acids, polyethylene glycol, and a saponified polyethylene-vinyl acetate copolymer.

7. A carbon nanotube bulk material, comprising:
carbon nanotubes constituting a matrix; and
a polymer binder interposed between the carbon nanotubes,
wherein the polymer binder includes a polymer backbone, and at least one organic moiety grafted to one of a terminal and a side of the polymer backbone; and
wherein the organic moiety has a $C_3$-$C_{24}$ aromatic functional group having at least one hydroxy group,
wherein the organic moiety is represented by Formula 1:

$$\text{*-L-Ar-(OH)}_n, \qquad \text{<Formula 1>}$$

where
"*" is a site for binding with the polymer backbone;
"L" is a linking group selected from the group consisting of —C(=O)—(CH$_2$CH$_2$O)$_a$—(C(=O)NH)$_b$—(CH$_2$)$_c$— and —NH—(CH$_2$CH$_2$O)$_d$—(C(=O)NH)$_e$—(CH$_2$)$_f$—;
"a", "c", "d", and "f" are independent integers ranging from 0 to 20, and "b" and "e" are independent integers ranging from 0 to 1;
"Ar" is one of a $C_6$-$C_{24}$ aryl group and a $C_3$-$C_{24}$ heteroaryl group; and
"n" is an integer ranging from 1 to 17.

8. A carbon nanotube bulk material, comprising:
carbon nanotubes constituting a matrix; and
a polymer binder interposed between the carbon nanotubes,
wherein the polymer binder includes a polymer backbone, and at least one organic moiety grafted to one of a terminal and a side of the polymer backbone; and
wherein the organic moiety has a $C_3$-$C_{24}$ aromatic functional group having at least one hydroxy group,
wherein the polymer binder includes a repeated unit represented by a formula selected from the group consisting of Formula 2A and Formula 2B:

<Formula 2A>

<Formula 2B>

9. The material according to claim 2, wherein the organic moiety has a grafting ratio of 1 to 90%.

10. A carbon nanotube bulk material, comprising:
carbon nanotubes constituting a matrix; and
a polymer binder interposed between the carbon nanotubes,
wherein the polymer binder includes a polymer backbone, and at least one organic moiety grafted to one of a terminal and a side of the polymer backbone; and
wherein the organic moiety has a $C_3$-$C_{24}$ aromatic functional group having at least one hydroxy group,
having a tensile strength of 800 to 1,400 MPa and a modulus of 80 to 140 GPa in a tensile test performed at a speed of 0.1 mm/minute using a strain gauge with a gauge length of 1 cm.

11. A method of fabricating a carbon nanotube bulk material, comprising:
providing a carbon nanotube aerogel as a matrix;
providing a polymer binder solution by dissolving a polymer binder in a volatile solvent, wherein the polymer binder includes a polymer backbone and at least one organic moiety grafted to one of a terminal and a side of the polymer backbone, wherein the organic moiety has a $C_3$-$C_{24}$ aromatic functional group having at least one hydroxy group;

infiltrating the polymer binder solution into the carbon nanotube aerogel; and removing the volatile solvent to densify the carbon nanotube aerogel.

12. The method according to claim 11, wherein the organic moiety is represented by Formula 1:

$$*\text{-L-Ar}\text{---}(OH)_n, \quad \text{<Formula 1>}$$

where

"*" is a site for binding with the polymer backbone;

"L" is a linking group selected from the group consisting of $-C(=O)-(CH_2CH_2O)_a-(C(=O)NH)_b-(CH_2)_c-$ and $-NH-(CH_2CH_2O)_d-(C(=O)NH)_e-(CH_2)_f-$;

"a", "c", "d", and "f" are independent integers ranging from 0 to 20, and "b" and "e" are independent integers ranging from 0 to 1;

"Ar" is one of a $C_6$-$C_{24}$ aryl group and a $C_3$-$C_{24}$ heteroaryl group; and "n" is an integer ranging from 1 to 17.

13. The method according to claim 11, wherein the volatile solvent includes one of methanol, ethanol, and isopropyl alcohol.

14. The method according to claim 11, wherein the polymer binder solution has a concentration between 0.01 wt % to 50 wt %.

* * * * *